United States Patent [19]

Volk, Sr.

[11] Patent Number: 5,245,918
[45] Date of Patent: Sep. 21, 1993

[54] PISTACHIO NUT HULLING APPARATUS

[75] Inventor: Joseph Volk, Sr., Gilroy, Calif.

[73] Assignee: Benjamin Volk, Gilroy, Calif.

[21] Appl. No.: 944,975

[22] Filed: Sep. 15, 1992

[51] Int. Cl.⁵ ............................................. A23N 5/00
[52] U.S. Cl. ........................................ 99/574; 99/579; 99/581; 99/617; 99/623
[58] Field of Search ............... 99/539, 540, 568, 579, 99/571–576, 581–583, 617, 623, 618–620; 426/481–483, 479

[56] References Cited

U.S. PATENT DOCUMENTS

| | | |
|---|---|---|
| 28,151 | 5/1860 | Burrows . |
| 320,486 | 6/1885 | Malcolm . |
| 801,593 | 10/1905 | Ireland ............................ 99/575 |
| 1,141,969 | 6/1915 | McFeely et al. . |
| 1,257,306 | 2/1918 | Blatt ................................ 99/575 |
| 1,274,803 | 8/1918 | Spitz ............................. 426/483 |
| 1,427,000 | 8/1922 | Lewinski ....................... 426/482 |
| 1,611,794 | 12/1926 | Vaughan ......................... 99/575 |
| 1,827,736 | 10/1931 | Coari .............................. 99/575 |
| 1,834,347 | 12/1931 | Nixon ............................. 99/579 |
| 2,339,596 | 1/1944 | Wright ............................ 99/581 |
| 2,355,810 | 8/1944 | Loewy .......................... 426/483 |
| 2,435,592 | 2/1948 | Loewy ............................ 99/620 |
| 2,481,201 | 9/1949 | Collier ............................ 99/581 |
| 3,951,056 | 4/1976 | McGehee ........................ 99/575 |
| 4,034,665 | 7/1977 | McFarland et al. .............. 99/579 |
| 4,448,115 | 5/1984 | Volk, Sr. ........................ 99/574 |
| 4,586,430 | 5/1986 | Tichy et al. .................... 99/425 |
| 4,819,331 | 4/1989 | Joyama .......................... 99/574 |
| 5,024,148 | 6/1991 | Moses ............................ 99/574 |
| 5,076,158 | 12/1991 | Tippett .......................... 99/574 |

Primary Examiner—Timothy F, Simone

[57] ABSTRACT

A pistachio huller provided wherein a means (16) having projections (18) pushes unhulled nuts between the surface of the means having projections and a surface of a means (30) having channels (28), the channels being wider than the pistachio nuts to be hulled. The projections protrude into the channels and the hulls are ruptured and abraded through contact between the surface of the means with projections and the surface of the channels whereby the nuts are hulled.

7 Claims, 3 Drawing Sheets

PISTACHIO NUT HULLING APPARATUS

BACKGROUND OF THE INVENTION

1. Field of the Invention

This invention relates to a huller for the removal of the hull containing a pistachio nut particularly directed to a method and apparatus which ruptures and abrades the hull from the pistachio nut.

2. Description of the Prior Art

The methods and apparatuses currently in use for pistachio dehulling work adequately but are primarily wet processing hullers using large volumes of water.

It is noted in U.S. Pat. No. 4,034,665 by Jay J. McFarland and Bertram E. Saunders for a "Pistachio Huller" that the pistachio industry has grown commercially in the San Joaquin Valley of the State of California during recent years with substantial acreage of this delicious nut being planted. These plantings are now in production and without the cheap labor of foreign countries it is not economically feasible to hull the harvested pistachios by hand. Noted in that patent is the statement that insofar as they could determine, prior to their invention, there had never been a practical mechanical huller for pistachios. The McFarland, et al patent discloses a two stage huller, the first stage to rupture the pericarps and to remove a portion of the hull and a second stage to strip the remaining portion of the pericarp from the shells. This patent discusses one embodiment used in connection with water wherein a water nozzle provides water to moisten and soften the pericarp and to rinse the fragments of pericarp from the shell. This type of prior art huller, in application, is water assisted, as are other prior art hullers where substantial amounts of water are used. Further, the hulling of pistachio nuts is known to present unusual problems. The hulls must be promptly removed after harvest or discoloration to the pistachio shell will occur within 24 hours and damage to the nut can result if the pistachio hull is not promptly removed after harvest. The hull of the pistachio is stronger than most nuts and has a greater adherence to the shell than most nuts and it is therefore more difficult to remove.

My own U.S. Pat. No. 4,448,115 (1984) describes a method and apparatus for the dry hulling of pistachio nuts and is directed to overcome the necessity for the use of water while hulling pistachio nuts and other associated problems of the prior art, but nevertheless now has been known to suffer some disadvantages:

(a.) Pins located on the rotating means can stab the pistachio nut shell and damage the pistachio nut and nut meat.

(b.) The yielding material which forms the slots tends to wear out under use and requires frequent replacement during the hulling operation.

(c.) Small nuts can go through the yielding slots under compression and be lost.

(d.) Frequent adjustment must be made as the yielding material wears out in order to properly process the pistachio nuts. Two separate means of adjustment were provided for this purpose.

(e.) Capacity of the roller is not fully used as nuts must go through adjacent slot areas alternately - not side by side. This reduces effective capacity by one-half.

(f.) There can be no assurance that suitable yielding material can be continued to be provided to meet the specification required at a reasonable price.

(g.) The huller requires removal of many components to do maintanance on the machine and or replacement of the yielding material.

(h.) Training is required to operate the machine to its best capacity, and must be monitored frequently to assure proper setting for correct hulling operations.

SUMMARY OF THE INVENTION

In view of the foregone disadvantages inherent in the prior art, the present invention provides an apparatus of new technology which overcomes these disadvantages.

The present invention provides for a rotary drum mounted on a support means for rotation about an axis with convex projections mounted peripherally on the drum designed to introduce harvested pistachio nuts into abrading channels to remove the hull. The rotary drum is disposed relative to a concave base of a slightly larger diameter than the rotary drum. The concave base mounted on the support means has rigid projections closely positioned thereupon facing the rotary drum in a manner to provide channels through which the pistachio nuts are guided. As the pistachio nut is guided by the convex projections on the drum through the channel, the hull is abraded from the pistachio nut by the rigid projections and surfaces forming the channel. The dehulled pistachio nut and the loose hull are ejected at the end of the concave base for separation preferably by means of blown air. Additionally, slots are provided at the base of each channel to allow for shard fragments of the hull to fall through and thus maintain a clean channel. The invention further comprises a method for dispensing nuts to be hulled into the apparatus and a means for moving the rotary drum.

Accordingly, the present invention has the advantage of hulling pistachio nuts without the use of water but without the disadvantages of prior art.

Another object of the present invention is that the convex projections are designed so as to not pierce the shell or damage the pistachio nut.

Another object of the present invention is to provide rigid construction of the concave base to prevent premature loss during processing.

Another object of the present invention is for rigid construction with no parts to wear and resulting in no adjustments being required during the operation of the apparatus. Once the machine is in operation no further operator support is required.

Further objects of the present invention are to provide a huller which is self-cleaning and has components which are easily replaced or repaired if required and the design of the invention is such as to allow for a more rugged construction for durability and greater longevity of the machine.

In summary the huller of the present invention has been found to answer the disadvantages of the prior art mentioned above and meets the requirements for an effective pistachio huller that requires no water in its operation. Comparison tests have shown that the present invention produces a quality product as good as that produced by the wet hullers currently in use, requires significantly less power and produces no pollutants. Other than the machine of the present invention there are no known effective dry hulling machines.

BRIEF DESCRIPTION OF THE DRAWING

In the drawings forming a part of the specification, like reference numerals are employed to designate like parts throughtout the same.

DESCRIPTION OF THE PREFERRED EMBODIMENT

Figure 1:
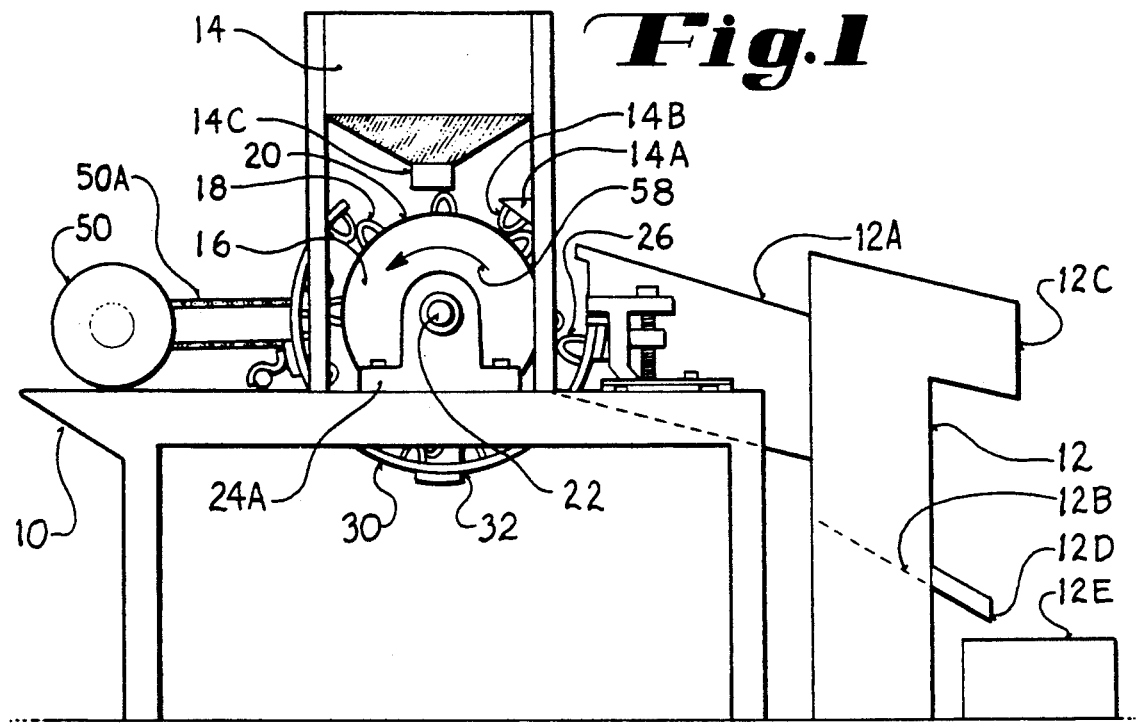
FIG. 1 is a side elevation view of the huller of the preferred embodiment of the present invention.
Figure 2:
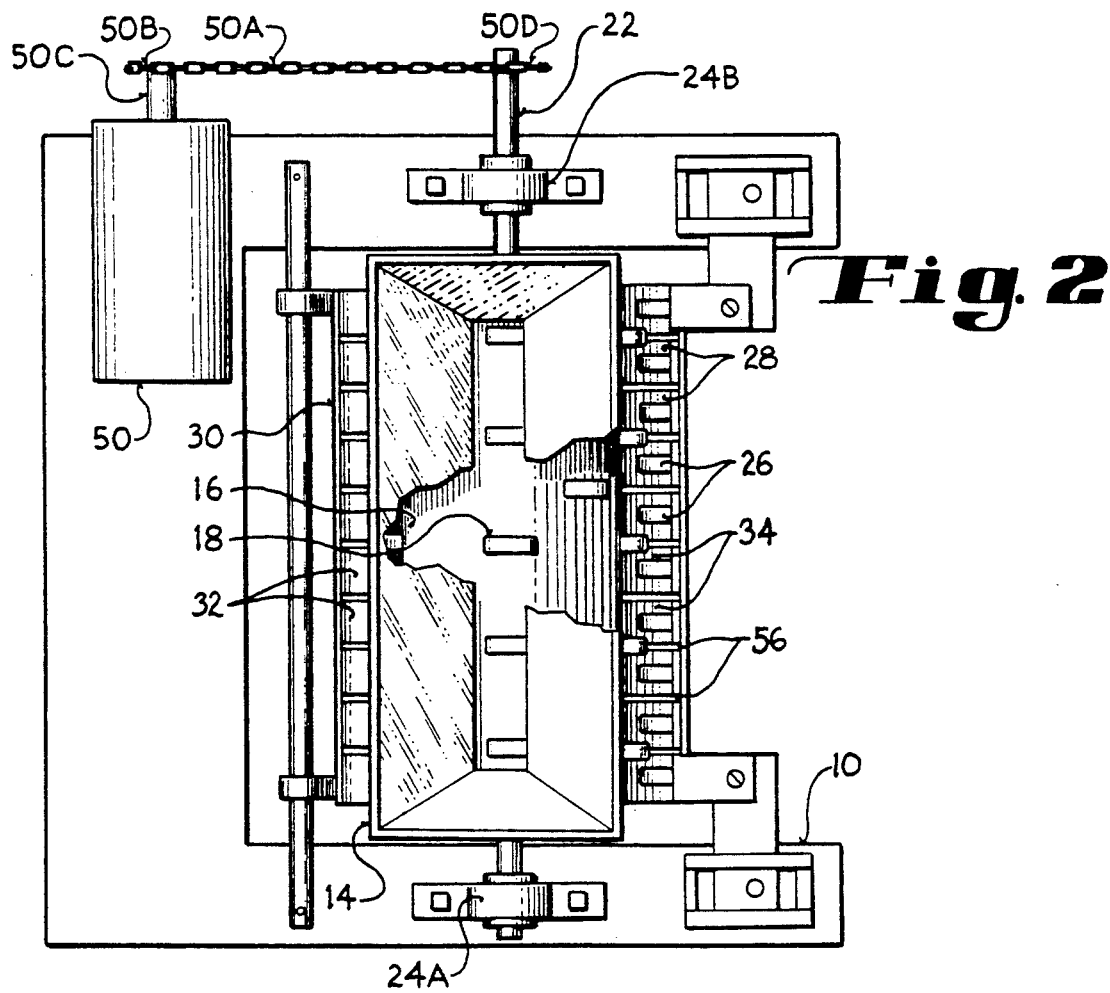
FIG. 2 is a top plan view of the huller of the preferred embodiment of the present invention without the air separator.

The preferred embodiment of the huller of my invention is illustrated in FIG. 1 (side view) and FIG. 2 (top plan view). In the present invention a frame 10 supports a hopper 14 for dispensing unhulled pistachio nuts to be hulled between a drum 16 and a base 30 having channels 28 followed by an air separator 12. The drum 16 has projections 18 disposed outwardly on the peripheral surface 20 thereof. The drum 16 is mounted on a shaft 22 extending through the center of the drum 16. The shaft 22 is journaled to frame 10 through suitable journals 24a and 24b which journals support the driving shaft 22.

Attached to the frame 10 is an electric motor 50 and a driving belt 50a which couples sprocket 50b attached to shaft 50c of the motor 50 and the sprocket 50d attached to the shaft 22. In operation the rotation of the drum 16 is in the direction indicated by the arrow 58.

The hopper 14 is provided to receive the unhulled pistachio nuts and is mounted to frame 10. The hopper has an elongated chute 14c which controls the passage of the unhulled nuts to be abraded between the peripheral surface 20 of the drum 16 and the base 30. A restrainer 14a is attached to the hopper 14 and extends the length of the drum 16 and is parallel to surface 20 of the drum 16. Restrainer 14a has projections 14b extending inwardly towards surface 20 between each row of projections 18, but not touching surface 20. The pistachio nuts coming from hopper 14 are prevented from going the wrong direction by the projections 14b.

The drum 16 is mounted above base 30 when rotating coacts with base 30 to push the nuts along the channels 28 formed within the base 30. The base 30 is shown in more detail in FIGS. 4 and 6 and is described in particular therein. The base 30 consists of a series of parallel bars 32 on which U-shaped projections 26 are located perpendicular to the upper surface 34 and the bars 32 spaced apart to provide slots 56. The projections 18 embedded in the surface 20 of the drum 16 force the nuts along the channels 28. The projections 18 are not located adjacent to each other to avoid a pulsing impact during the huller operation. As the nuts pass along the surface 34 while the nuts are in the channels 28 they are dehulled by the abrasive force generated between the drum 16, the base 30 and the projections 26. The dehulled nuts and loose hulls are ejected from the base by the drum projections 18. Once ejected the produce enters chute 12a and passes through air separator 12 Air blowing past the screen 12b of air separator 12 causes the hulls to be blown out opening 12c while the hulled pistachio nuts drop out opening 12d into container 12e.

Figure 3:
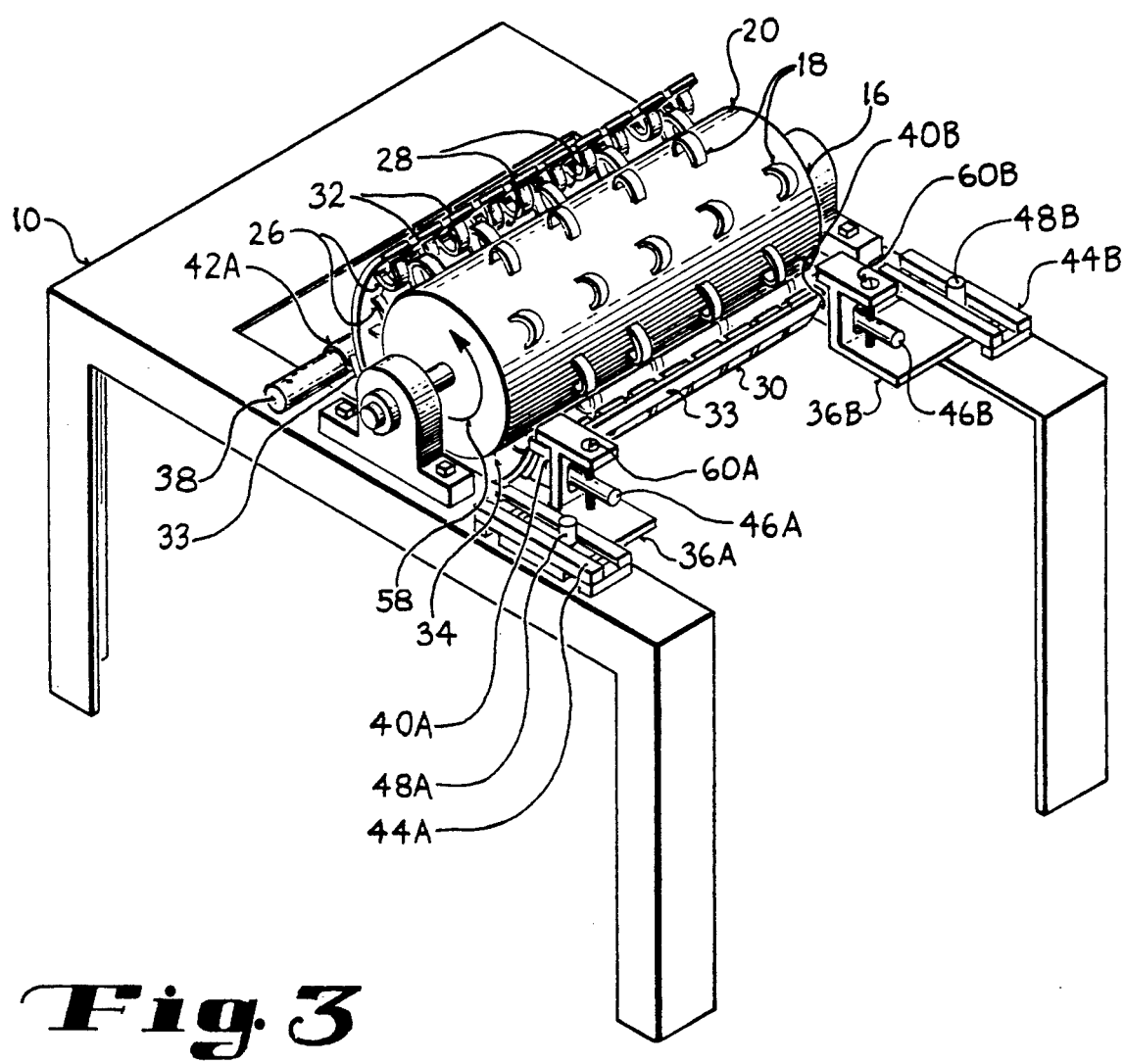
FIG. 3 is a perspective view of the huller shown in FIG. 1 and FIG. 2 without the hopper, air separator or motor.
Figure 6:
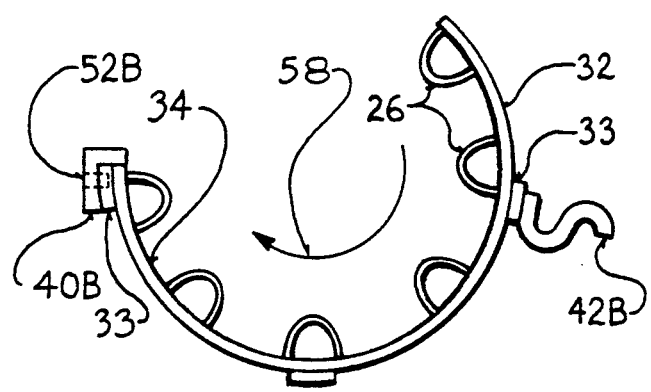
FIG. 6 is a cross section of the means having channels along the line 7—7 in FIG. 4 looking at the arrow.

Referring now to FIG. 3, a perspective view of the preferred embodiment of the present invention is shown without air separator 12, hopper 14 or motor 50. The distance of the surface 34 of bars 32 from the peripheral surface 20 of drum 16 is built into the huller and requires no special adjusting. The distance is set so that projections 18 extending outwardly and perpendicular to the peripheral surface 20 of the drum 16 extend into the channels 28 formed by the bars 32 and projections 26. Projections 18 push the pistachio nut passing between said surface 20 and said surface 34 and projections 26 when the drum 16 is rotated in the direction indicated by arrow 58. The ends of bars 32 are coupled to support bars 33 and are secured to maintain proper spacing of channels 28. On the product input end support bar 33 has hooks 42a (and 42b not visible in FIG. 3) to couple onto rod 38 located on frame 10. Support bar 33 on the product eject end of base 30 has locator plates 40a and 40b attached which contain dowel pin holes 52a and 52b not shown. This eject end connects to frame 10 by posit-clamps 36a and 36b. Base 30 is removed by turning screws 60a and 60b to lower dowel pins 46a and 46b which interface into the dowel pin holes 52a and 52b not shown in locator plates 40a and 40b. (dowel pin hole is shown in FIG. 6). Removal of locator pins 48a and 48b allows posit-clamp base 36a and 36b to slide away from base 30 under guide assemblies 44a and 44b which are attached to frame 10 thus releasing base 30 from pins 46a and 46b. Base 30 is now free to be removed. To attach base 30 to frame 10, the sequence is reversed and when completed with the tightening of screws 60a and 60b, plate 40a and 40b is secured against posit-clamps 36a and 36b providing a fixed, positive connection for base 30 to frame 10.

In operation the hopper 14, not shown in FIG. 3, dispenses unhulled nuts between base 30 and the surface 20 of the drum 16 with the drum disposed above and in close proximity to base 30. The unhulled pistachio nuts fall into the channels 28 which channels are spaced apart at a distance sufficient to allow one pistachio nut at a time to move through each channel 28. The nuts, as they are pushed by pins 18 when drum 16 is rotated in the direction of arrow 58, are abraded by contact between peripheral surface 20 and surface 34 and projections 26 as is more particularly described hereinbelow.

Figure 4:
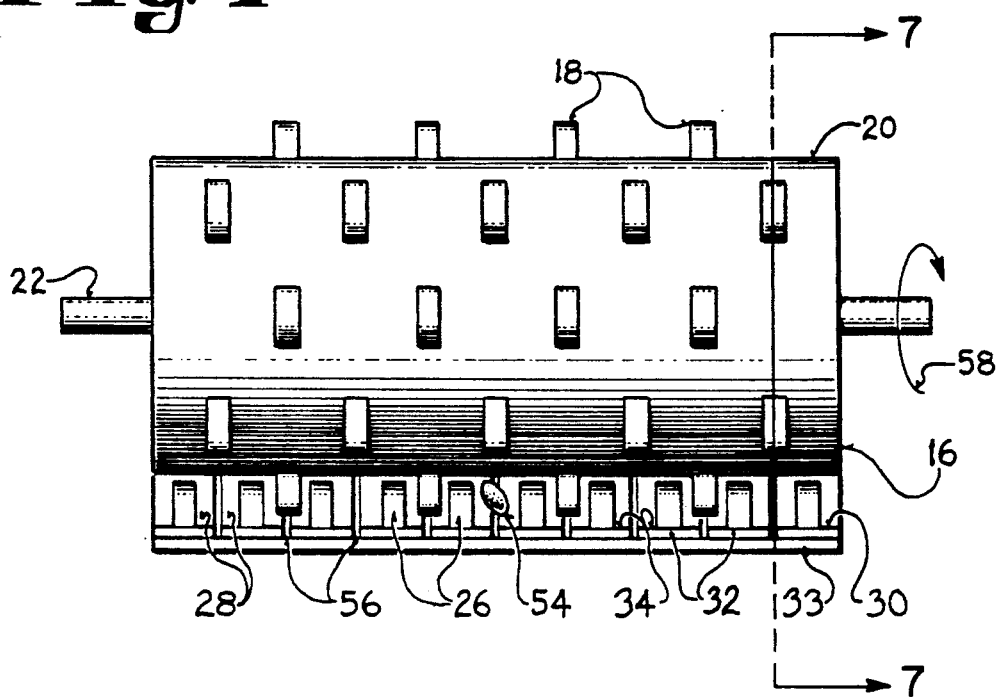
FIG. 4 is a top view of a drum having projections and a fragmentary view of the means having channels of the present invention.

Referring now to FIG. 4, a top perspective view of the base 30 and drum 16. Drum 16 mounted on shaft 22 has projections 18 mounted on surface 20. Base 30 consists of a series of rigid parallel bars 32. The bars 32 are retained in parallel position by backing bars 33 which extend across the bottom of the bars 32 and attached to the surface opposite to surface 34 of bars 32. Bars 32 are separated from each other to form slots 56 therebetween to provide a self-cleaning feature of the invention. I have found that for the hulling of pistachio nuts, a width of approximately one fourth of an inch (approximately 6.35 millimeters) between the bars 32 is particularly effective when the bars 32 are formed in parallel relationship to each other.

Projections 26 are spaced to allow one pistachio nut 54 at a time to pass thru channel 28. As drum 16 rotates in the direction of the arrow 58 the projections 18 pass through channels 28 the unhulled pistachio nut being pushed by one of the pins 18 not shown is forced to pass between the surface 20 of the drum 16 and surfaces of channel 28, which channel 28 provides a space greater than the width of a pistachio nut. The rubbing and abrading action of surface 34 and projections 26 and drum surface 20 on the hull of the pistachio nut 54 ruptures the hull and the hull is stripped away from the the nut 54.

Figure 5:
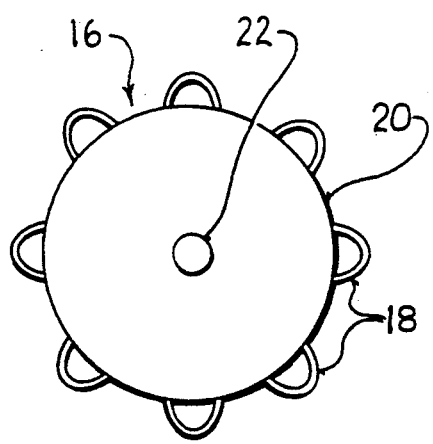
FIG. 5 is a cross section of the drum along the line 7—7 in FIG. 4 looking at the arrow.

Referring now to FIG. 5, a cross section of drum 16 along the line 7—7 is shown. FIG. 5 shows drum 16 on shaft 22 with the orientation of projections 18 attached thereto on surface 20. Projections 18 are U-shaped which act as a cam to gently ease the pistachio nuts thru the hulling operation. I have found the U-shape of projections 18 prevents damage to the nuts from crushing or piercing the pistachio nut.

Referring now to FIG. 6, a cross section of base 30 along line 7—7 notes rotation of drum 16 not shown, in direction of arrow 58. This figure shows the projections 26 attached to surface 34 of bar 32. Bars 33 keep the bars 32 and projections 26 properly spaced. Location of hook 42b attached to strip 33 is shown. Also shown is location of locator plate 40b attached to base 30 at strip 33 with identity of dowel hole 52b for interfacing with dowel 46b of posit-clamp 36b not shown.

With the embodiments and advantages of the present invention having been set forth in detail for the purposes of making a complete disclosure of the invention, it may be apparent to those of skill in the art that numerous changes may be made in matters of size, shape and arrangement of parts without departing from the objects and principles of the invention. The scope of the invention is defined as expressed in the claims.

I claim:

1. A hulling apparatus for removing hulls from pistachio nuts comprising:
   a. a support means;
   b. a rigid concave means attached to the support means, said concave means having an inward facing surface having thereon rigid projections facing inward spaced to provide longitudinal channels, said channels being of greater width and height than the pistachio nuts to be hulled;
   c. a drum having a peripheral surface rotatably mounted on an axis on the support means, said drum having a plurality of projections outwardly disposed on said peripheral surface and said surface therefore disposed in close proximity to said concave means having channels, said projections being spaced apart on the drum with said surface having projections so that said projections extend into said channels; and
   d. means for moving said drum with surface having a plurality of projections whereby unhulled pistachio nuts deposited into the channels of the said rigid concave means are moved through the channels by the projections of the said drum whereby the pistachio nuts are hulled.

2. A huller as in claim 1 further characterized by a means for depositing unhulled pistachio nuts into the channels of the said rigid concave means and moved through by projections on said drum whereby the pistachio nuts are hulled.

3. A huller as in claim 1 further characterized by said concave means having an inward facing surface whereby said surface has surface openings in said channels.

4. A huller as in claim 1 further characterized by said surface of the concave means having openings being longitudinal slots in said channels.

5. A huller as in claim 1 further characterized by said drum having a peripheral surface having projections and said concave means having an inward facing surface having projections said projections being U-shaped, with the apogee of the U-shaped projections facing outward from the said surfaces.

6. A huller as in claim 1 further characterized by said concave means having channels being secured to said support means by a clamp at one end and a support hook at the other end.

7. A huller for removing hulls from pistachio nuts comprising:
   (a) a means having a plurality of concave rigid parallel bars having adjacent surfaces between said parallel bars and said bars having inner surfaces thereof and perpendicular projections on said inner surfaces to form channels;
   (b) positioning means for maintaining said bars in parallel and for maintaining said channels so that pistachio nuts are more narrow than the width of said channels;
   (c) rotating means having a plurality of projections outwardly disposed on a surface thereof and being disposed in close proximity to said means having channels for aligning said projections between adjacent surfaces of said channels and pushing unhulled pistachio nuts with said projections through said channels;
   (d) means for moving said rotating means for passing said projections between said channels whereby unhulled pistachio nuts are abraded and thereby hulled; and
   (e) means for depositing unhulled pistachio nuts between said means having channels and said rotating means.

* * * * *